United States Patent
Klein et al.

(12)

(10) Patent No.: US 6,531,563 B1
(45) Date of Patent: Mar. 11, 2003

(54) POLYMER BASED ON A CONJUGATED DIENE AND A DIENOPHILIC COMPONENT

(75) Inventors: Johann Klein; Kai Boege, both of Duesseldorf; Wolfgang Klauck, Meerbusch, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/319,661

(22) PCT Filed: Dec. 5, 1997

(86) PCT No.: PCT/EP97/06824

§ 371 (c)(1),
(2), (4) Date: Jun. 10, 1999

(87) PCT Pub. No.: WO98/25978

PCT Pub. Date: Jun. 18, 1998

(30) Foreign Application Priority Data

Dec. 13, 1996 (DE) .......................... 196 51 796
Dec. 20, 1996 (DE) .......................... 196 53 373

(51) Int. Cl.$^7$ ............................................. C08F 122/02
(52) U.S. Cl. .................... 526/318.2; 526/259; 526/264; 526/272; 526/318.3; 526/318.4; 526/318.6; 526/328.5; 526/332; 526/335; 526/347
(58) Field of Search ................. 526/259, 264, 526/272, 318.2, 318.3, 318.4, 318.6, 328.5, 332, 335, 347

(56) References Cited

U.S. PATENT DOCUMENTS

| 2,224,678 A | | 12/1940 | Hathaway ..................... 250/20 |
| 2,261,633 A | | 11/1941 | Spooner ....................... 201/63 |
| 2,278,425 A | | 4/1942 | Colbeth ....................... 260/398 |
| 2,392,119 A | | 1/1946 | Colbeth ..................... 260/405.5 |
| 4,082,710 A | * | 4/1978 | Vrancken et al. ......... 260/23 TN |
| 4,775,730 A | | 10/1988 | Gupta .......................... 526/326 |

FOREIGN PATENT DOCUMENTS

| DE | 20 18 712 | 11/1971 |
| DE | 42 11 118.8 | 10/1993 |
| GB | 671 368 | 1/1950 |
| GB | 841 700 | 3/1958 |
| JP | 5 1121 | 8/1993 |
| JP | 5 295041 | 9/1993 |

OTHER PUBLICATIONS

Bull. Chem. Soc. Japan, vol. 40 (1967) pp. 1272–1273.
Sci. Technol. 94 (1992) pp. 206–208.
Paint Manufacture, (1949) p. 19, p. 118.

* cited by examiner

Primary Examiner—Helen L. Pezzuto
(74) Attorney, Agent, or Firm—Stephen D. Harper; Arthur G. Seifert

(57) ABSTRACT

Polymerization of a fatty acid or fatty acid derivatives containing conjugated double bonds and alkenes or alkynes containing electron acceptor substituents provides compositions useful as coatings, adhesives, sealants, fillers and the like.

36 Claims, No Drawings

POLYMER BASED ON A CONJUGATED DIENE AND A DIENOPHILIC COMPONENT

BACKGROUND OF THE INVENTION

1. Field of the Invention

This invention relates to a polymer based on a conjugated diene and dienophilic component, to its production and to its use.

2. Discussion of Related Art

Such polymers are known. Thus, Japanese patent JA 93/1121 describes a copolymer produced from a maleic anhydride, a conjugated diene and an aliphatic monoolefin. Butadiene was used as the conjugated diene and isobutene as the aliphatic monoolefin. The polymerization was carried out in the presence of a peroxide at temperatures of around 150° C. The molecular weight Mw is in the range from 500 to 50,000.

SUMMARY OF THE INVENTION

In Bull. Chem. Soc. Japan 40 (1967), pages 1272 to 1273, Iwamoto and Yuguchi describe alternating copolymers of 2,4-hexadiene and maleic anhydride. The polymerization is initiated by heating and/or by radical-forming initiators. It may be carried out both in bulk and in solution. The yields are of the order of 2 to 97%.

Japanese patent JA 93/295041 also describes a copolymer of a conjugated diene and maleic anhydride. Conjugated dienes are butadiene or isoprene. The catalyst used is an acetyl acetonate with metals of Group VII or Group VIII. The polymer is used for coating, for surface treatment, for sealing and as an adhesive.

These known polymers have the following disadvantages:

DETAILED DESCRIPTION OF THE INVENTION

On the one hand, both monomers are based on petrochemicals and thus lead to a more negative ecological assessment by comparison with the use of monomers based on renewable raw materials. On the other hand, the range of raw materials for petrochemical conjugated dienes is limited to butadiene and simple derivatives or homologs thereof. The use of these short-chain dienes represents not only a process-related disadvantage on account of the volatility and ready inflammability of these monomers. From the chemical perspective, too, these compounds only allow minor variations in the chemical properties of the polymers. For example, no reactions with functionalized dienes are possible or indeed described.

Reaction products of maleic anhydride with fatty acids containing conjugated double bonds are also known. However, the reactions involved here are additions based on the Diels-Alder Reaction. This reaction is described, for example, by Behr and Handwerk in Sci. Technol. 94 (1992), pages 206 to 208.

The problem addressed by the present invention was to provide new high-performance polymers based on renewable raw materials by an economic method.

The solution provided by the invention is defined in the claims and lies essentially in a polymer obtainable from:

A) at least one fatty acid with a conjugated C—C double bond or derivatives thereof, B) at least one alkene or alkine component containing electron acceptor substituents and optionally C) at least one copolymerizable alkene component with no electron acceptor substituents.

Component A

The "fatty acid containing a conjugated C—C double bond" (component A) is an aliphatic unsaturated carboxylic acid containing 6 to 32 and, more particularly, 16 to 24 carbon atoms which has two or more conjugated C—C double bonds. This so-called conjuene fatty acid may be used in functionalized form as an ester or amide for the polymerization reaction.

One preferred embodiment of the invention is characterized by the use of esters or partial esters of the conjuene fatty acids with monohydric or polyhydric alcohols. "Alcohols" are understood to be hydroxyl derivatives of aliphatic or alicyclic, saturated or unsaturated, linear or branched hydrocarbons. Both monohydric and dihydric alcohols or higher alcohols may be used. Specific examples from the low molecular weight range include methanol, ethanol, propanol, butanol, pentanol, decanol, octadecanol, 2-ethylhexanol, 2-octanol, ethylene glycol, propylene glycol, trimethylene glycol, tetramethylene glycol, 2,3-butylene glycol, hexamethylenediol, octamethylenediol, neopentyl glycol, 1,4-bis-hydroxymethyl cyclohexane, Guerbet alcohol, 2-methylpropane-1,3-diol, hexane-1,2,6-triol, glycerol, trimethylol propane, trimethylol ethane, penta-erythritol, sorbitol, formitol, methyl glycoside, butylene glycol, reduced dimer and trimer fatty acids and higher polyethylene, polypropylene and polybutylene glycols. Alcohols derived from colophony resins, such as abietyl alcohol, may also be used for the esterification. OH-containing tertiary amines may also be used.

Other suitable derivatives of the conjuene fatty acids are amides which may be obtained by reaction with ammonia, primary and secondary amines or polyamines, for example with monoethanolamine, stearylamine, diethanolamine, ethylenediamine and hexamethylenediamine.

The "fatty acid containing a conjugated C—C double bond" may be obtained in various ways.

The conjugated double bond may also have been originally present (naturally occurring conjuene fatty acids).

The conjugated double bond may be formed by selective hydrogenation of fatty acids containing conjugated triple bonds (conjuene fatty acids by selective hydrogenation).

The conjugated double bond may also be formed by isomerization of so-called isolene fatty acids either thermally or by the action of catalysts (conjuene fatty acids by isomerization). For example, the isolated double bonds in linoleic, linolenic, arachidonic and clupanodonic acid are converted into conjugated double bonds by the action of catalysts. Specific isomerization catalysts are nickel on supports, transition metals/noble metals, tert.butyl hypochloride, iodine/iodide, sulfur dioxide, selenium/selenium-containing catalysts, metal complexes, alkali metals, treated clays, sulfur-containing catalysts, alkali metal alcoholates and alkali metal hydroxides.

In addition, the conjugated double bond may be formed by dehydration of hydroxyfatty acids either from hydroxy compounds already containing a correspondingly positioned double bond or from dihydroxyfatty acids. The dehydration of hydroxyfatty compounds to conjugated fatty compounds is largely achieved by the addition of acidic catalysts.

Numerous catalysts are described in the literature, for example for the dehydration of castor oil, including for example hetero polyacids (U.S. Pat. No. 2,261,633, 1939), $Na_2S_2O_7$ (Paint Manuf. 19, 118, 1949), sulfuric acid (U.S. Pat. No. 2,392,119, 1946), phosphorous acid (GB 671,368, 1952), boric acid (U.S. Pat. No. 2,278,425, 1939) and phthalic anhydride (U.S. Pat. No. 224,678), which lead to dehydrated castor oils. The conjugated fatty acids may be obtained from these oils by hydrolysis. However, acetylated hydroxyfatty compounds may be converted into the conjugated fatty acids by thermal ester pyrolysis. Thus, DE-C3-20 18 712, for example, describes the pyrolysis of diacetoxystearic acid methyl ester at 420 to 580° C. which is said to give conjuene yields of 80%.

Finally, the conjugated double bonds may be produced by partial or total syntheses.

The polymerization may have to be preceded by stereoisomerization into the E,Z-, Z,E- or Z,Z-configuration.

The following are specific examples of fatty acids containing conjugated double bonds:

naturally occurring conjuene fatty acids, such as sorbic acid, 2,4-decadienoic acid, 2,4-dodecadienoic acid, 10,12-octadecadienoic acid, 9-hydroxy-10,10-octadecadienoic acid, 13-hydroxy-9,11-octadecadienoic acid, 9,14-dihydroxy-10,12-octadecadienoic acid, 9,12,14-octadecatrienoic acid, 8,10,12-octadecatrienoic acid, elaeostearic acid (trichosanoic acid: punicic acid; catalpa acid), licanic acid, camolenic acid, parinaric acid;

conjuene fatty acids by selective hydrogenation, such as isanoic acid, isanolic acid, ximenynic acid, matricaria acid, lachnophyllic acid, mycomycinic acid;

conjuene fatty acids by isomerization of isolene fatty acids, for example Edenor UKD 60/10(Henkel KGaA);

conjuene fatty acids by dehydration of hydroxyfatty acids, such as ricinene fatty acid from ricinoleic acid.

Preferred components A are ricinene fatty acid, ricinene fatty acid methyl ester, UKD fatty acids, UKD fatty acid methyl ester, dehydrated castor oil, conjugated safflower oil and sunflower oil. The UKD fatty acids or fatty acid methyl esters are fatty acids and fatty acid methyl esters with conjugated double bonds which can be obtained from polyunsaturated fatty acids, more especially based on sunflower oil.

Component B1

An "alkene or alkyne component containing electronic acceptor substituents" (component B) is understood to be a compound containing 3 to 100 and, more particularly, 4 to 32 carbon atoms which, adjacent the C—C double or C—C triple bond, contains at least one electron-attracting substituent, for example one of the following groups: —CN, —COOH, —CHO, —COR, —COOR, —CONH$_2$, —CONHR, —CONR$^2$ or —NO$_2$, where R is an alkyl group containing 1 to 98 carbon atoms.

Specific examples are maleic acid, citric acid, itaconic acid, aconitic acid, acetylene dicarboxylic acid and 3,4,5,6-tetrahydrophthalic acid. However, derivatives of these acids, such as anhydrides, imides, alkylimides containing 1 to 30 carbon atoms in the alkyl group, nitriles, amides, alkyl and arylamides containing 1 to 30 carbon atoms in the alkyl/aryl group, aldehydes, esters and semiesters of alcohols containing 1 to 30 carbon atoms. Examples of such derivatives include maleic anhydride, maleic imide, maleic acid dinitrile, maleic acid dihexyl ester, maleic acid benzyl butyl ester, fumaric acid dihexyl ester, fumaric acid dinitrile, fumaric acid monoethyl ester, itaconic anhydride, itaconic acid dimethyl ester, acetylene dicarboxylic acid diethyl ester and 3,4,5,6-tetrahydrophthalic anhydride. Mixtures of the derivatives mentioned may also be used.

Preferred components B1 are maleic acid, citraconic acid, itaconic acid, aconitic acid, 3,4,5,6-tetrahydrophthalic acid and derivatives thereof.

Component B2

Besides the acids mentioned above, the corresponding derivatives of the following acids may be used as a second component: crotonic acid, cinnamic acid, acrylic acid, methacrylic acid, cyanoacrylic acid and 2,4-pentadienoic acid. These acids may also be used in the form of derivatives, such as amides, alkyl and dialkyl amides containing 1 to 30 carbon atoms in the alkyl group, nitriles, aldehydes, esters and semiesters of alcohols containing 1 to 30 carbon atoms. Examples include, methyl, ethyl, n-propyl, n-butyl, isopropyl, isobutyl, sec.butyl and tert.butyl, n-pentyl, n-hexyl, 2-ethylhexyl, cyclohexyl, n-heptyl, n-octyl, phenylethyl, 2-methoxyethyl, 2-butoxyethyl, phenylpropyl and furfuryl acrylate and methacrylate; also cinnamic acid ethyl ester, crotonic acid amide, methacrylamide, acrylamide, ethyl cyanoacrylate, methyl crotonate, crotonic acid nitrile, cinnamic acid benzyl ester and cinnamic aldehyde.

Component C

An "alkene with no electron acceptor substituents" (component C) is, for example, a vinyl ether, vinyl ester, x-olefin, styrene derivative, conjugated hydrocarbon or vinyl pyrrolidone, the alkyl group of the ethers and esters containing 1 to 30 carbon atoms. Examples include vinyl acetate, propionate, butyrate, laurate and stearate, ethyl vinyl ether, 1-decene and α-methyl styrene, β-methyl styrene, vinyl toluene and tert.butyl styrene, chlorostyrene, butadiene and isoprene. Preferred components C are vinyl ether, vinyl ester, styrene and vinyl pyrrolidone.

The molar ratio between components A, B and C is in the range from 1:0.1 to 10:0 to 10 and preferably in the range from 1:0.5 to 1.5:0.2 to 10.

The average molecular weight (weight average Mw) of the polymers according to the invention is above 5,000 and preferably above 10,000. Molecular weights of up to 1,700,000 g/mole were obtained. The molecular weights were determined by gel permeation chromatography (see Examples).

The properties of the polymers according to the invention depend upon the educts and the reaction conditions and range from soft, extremely tacky through rubber-elastic to non-tacky, solid polymers.

Basically, the polymers according to the invention may be prepared simply by mixing the reaction components A and B and optionally C and heating the resulting mixture.

The polymers according to the invention may be prepared both in bulk and in solution or dispersion. Suitable solvents are those which do not have a radical-inhibiting effect. The solvents used are selected, for example, from ethers, such as tetrahydrofuran and dioxane; alcohols, such as methanol, ethanol and isopropanol; esters, such as ethyl acetate, propyl acetate and n-butyl acetate; glycol ether acetates, such as methyl, ethyl and butyl glycol acetate; ketones, such as acetone and cyclohexanone; dialkyl carboxylic acid amides, such as dimethyl formamide, dimethyl acetamide and N-methyl pyrrolidone; aromatic hydrocarbons, such as benzene, toluene and the xylenes; aliphatic hydrocarbons, such as hexane and isooctane; alicyclic hydrocarbons, such as cyclohexane; and chlorinated hydrocarbons, such as methylene chloride, chloroform, dichloroethane and tert.butyl chloride. Other suitable solvents are substances which, by virtue of their low vapor pressure, are normally used as plasticizers, for example fatty acid esters, polyethylene glycols and phthalic acid esters.

However, the polymerization may also be carried out as emulsion polymerization (droplet polymerization).

If no initiators are used, the reaction temperature should be in the range from 20 to 250° C. and more particularly in the range from 80 to 200° C. Since the reaction is exothermic, it is sufficient to heat the reaction mixture to temperatures of 40 to 150° C. If radical-forming initiators are used, temperatures of 0 to 200° C. and, more particularly, 30 to 150° C. are sufficient as the reaction temperature.

Suitable radical initiators are acetyl cyclohexane sulfonyl peroxide, peroxydicarbonates, diisopropyl peroxydicarbonate, t-amyl perneodecanoate, t-butyl perneodecanoate, t-amyl perpivalate, bis-(2,4-dichlorobenzoyl)-peroxide, t-butyl perpivalate, bis-(3,5,5-trimethylhexanoyl) peroxide, dioctanoyl peroxide, didecanoyl peroxide, dilauroyl peroxide, bis-(2-methylbenzoyl)-peroxide, succinyl peroxide, diacetyl peroxide, dibenzoyl peroxide, t-butyl-per-2-ethyl hexanoate, bis-(4-chlorobenzoyl)-peroxide, t-butyl perisobutyrate, t-butyl permaleate, 1,1-bis-(t-butylperoxy)-3,5,5-trimethyl cyclohexane, 1,1-bis-(t-butylperoxy)-cyclohexane, t-butylperoxyisopropyl carbonate, t-butyl-per-3,5,5-trimethylhexanoate, 2,5-dimethylhexane-2,5-diperbenzoate, t-butyl peracetate, t-amyl perbenzoate, t-butyl perbenzoate, 2,2-bis-(t-butylperoxy)-butane, 2,2-bis-(t-butylperoxy)-propane, dicumyl peroxide, t-butyl cumyl peroxide, 3-t-butylperoxy-3-phenyl phthalide, bis-(t-butylperoxyisopropyl)-benzene, 2,5-dimethylhexane-2,5-di-t-butyl peroxide, 3,5-bis-(t-butylperoxy)-3,5-dimethyl-1,2-dioxalane, di-t-butyl peroxide, 2,5-dimethylhexine-3,2,5-di-t-butyl peroxide, 3,3,6,6,9,9-hexamethyl-1,2,4,5-tetraoxacyclononane, p-menthane hydroperoxide, pinane hydroxide, diisopropylbenzene monohydroperoxide, cumene hydroperoxide, t-butyl hydroperoxide, azo-bis-(2,4-dimethylvaleronitrile), azo-bis-(isobutyronitrile), dibutyl peroxydicarbonate, diisononanoyl peroxide, t-butyl perisononanoate, di-t-butyl peroxide, 1,1-bis-(t-butylperoxy)-3,5,5-trimethyl cyclohexane, 3,5-bis-(t-butylperoxy)-3,5-dimethyl-1,2-dioxolane, 2,5-dimethylhexine-2,5-di-t-butyl peroxide, acetyl cyclohexane sulfonyl peroxide, dicyclohexyl peroxydicarbonate, bis-(4-t-butylcyclohexyl)-peroxydicarbonate, di-2-ethylhexyl peroxydicarbonate, dimyristyl peroxydicarbonate, dicetyl peroxydicarbonate, t-butyl perisononanoate, t-butyl perbenzoate, t-butyl perpivalate, t-butyl peroxymaleate, t-butyl peroxybenzoate, dicumyl peroxide, didecanoyl peroxide, methyl ethyl ketone peroxide, 2,2'-azo-bis-(2,2-dimethylvaleronitrile), 2,2'-azo-bis-(2,3-dimethylbutyronitrile) and 2,2'-azo-bis-isobutyronitrile.

These radical initiators are used in quantities of 0.05 to 10% by weight and, more particularly, in quantities of 0.1 to 3% by weight, based on component A.

It has surprisingly been found that, in the case of technical conjuene fatty acids containing saturated and unsaturated fatty acids, such as stearic, oleic and linoleic acid, as secondary components, the polymerization reaction is not inhibited although the unsaturated fatty acids containing isolated double bonds do themselves have inhibitor properties. Accordingly, the reaction product generally contains these very fatty acids or derivatives thereof as an extractable secondary constituent. The crude polymers therefore had soft-elastic properties which can be advantageous for special applications. Plasticizer-free polymers can be obtained by purification, for example by distillation or fractional precipitation.

Where polymerization is carried out in solution, the polymer can precipitate. Should this not be the case, the polymer is precipitated by addition of a solvent with a lower or higher polarity than the reaction medium. In general, the monomeric secondary products remain in solution where working up is carried out in this way and can thus be removed. The polymers can also be fractionated by dissolution and precipitation, for example with acetone/hexane or acetone/water mixtures. The polymers may also be freed from monomers and other low molecular weight substances by distillation.

The polymers thus produced may be directly used for coating, bonding, sealing, filling or as a material.

However, the reactive groups in the polymer may also be completely or partly reacted. Carboxylic acid or derivatives thereof, above all the anhydride group of the polymer according to the invention, are suitable for this purpose.

The polymer-modifying reagents may be monofunctional or polyfunctional.

The functionalities well known from organic chemistry may serve as the functional groups. These include, above all, hydroxy, mercapto, ether, ester, carboxyl, carboxylate, amino and amido groups. Groups reactive to the polymer are, above all, epoxy, isocyanate, mercapto, hydroxy and amino groups. Specific examples of polymer-modifying reagents are alcohols, such as methanol, ethanol, isopropanol, butanol, long-chain fatty alcohols, unsaturated fatty alcohols, branched fatty alcohols, fatty alcohol ethoxylates, abietol, benzyl alcohol, phenoxyethanol, monoethanolamine, diethanolamine, triethanol amine, ethylene glycol, propylene glycol, polyethylene glycols, polypropylene glycols, hexane-1,6-diol, 1,12-dihydroxyoctadecane, glycerol diacetate, 1,2-O-isopropylidene glycerol, monoacyl glycerides, ricinoleic acid methyl ester, lactic acid ethyl ester, hydroxybutyric acid;

amines, such as butylamine, octadecylamine, benzylamine, ethylenediamine, hexamethylenediamine, Jeffamines, 1,4-phenylenediamine;

epoxides, such as ethylene oxide, propylene oxide, cyclohexene oxide, $\alpha$-olefin oxides, epoxidized fats and oils, epoxidized fatty acids and alkyl esters thereof, epoxy hardeners, such as bisphenol-A-diglycidyl ether.

The compounds obtained by the polymer-analog reaction may in turn be further reacted, for example by oxidative post-curing in the presence of siccatives, grafting, dehydration to imides and reaction with isocyanates.

Salt formation, vulcanization, post-crosslinking with peroxides and hydrogenation are also mentioned as particular forms of polymer modification. So far as the reaction with salts is concerned, it is important to distinguish between monovalent and polyvalent metals. The polyvalent metals, for example calcium, zinc and aluminium, lead to crosslinked polymers (ionomers), as described in DE 42 11 118. Crosslinked polymers may also be otherwise obtained where polyfunctional reagents are used.

The polymer-analog reaction may be carried out in bulk or in solution. Only solvents which do not react with the functional groups of the polymer are suitable, for example ethers, such as diethyl ether, tert.butyl methyl ether, tetrahydrofuran and dioxane; esters, such as ethyl and propyl acetate and n-butyl acetate; glycol ether acetates, such as methyl, ethyl and butyl glycol acetate, ketones, such as acetone and cyclohexanone; dialkyl carboxylic acid amides, such as dimethyl formamide, dimethyl acetamide and N-methyl pyrrolidone; aromatic hydrocarbons, such as benzene, toluene and the xylenes; aliphatic hydrocarbons, such as hexane and isooctane; alicyclic hydrocarbons, such as cyclohexane; and chlorinated hydrocarbons, such as methylene chloride, chloroform, dichloroethane and tert.butyl chloride.

However, the modifying reagent may also be used as the solvent. For example, alcohols, such as methanol, ethanol or isopropanol, and amines, such as butylamine, etc., may be used.

A plasticizer may also be used as the solvent in the modification reaction.

The physical and chemical properties of the polymers according to the invention initially formed may be significantly varied by this polymer-analog reaction. Thus, a soft resin with extremely tacky properties is obtained after treatment with methanol. The precipitation of polymers with solvents having a lower or higher polarity than the reaction medium leads to non-tacky elastic polymers which can be drawn to form transparent films.

The polymers according to the invention may be used for coating, bonding, sealing, filling and as a material, for example as hotmelt adhesives, tackifiers or high-tack dispersions. The polymers according to the invention in the form of their salts are also suitable as builders for detergents, as stabilizers for emulsions and as thickeners.

The polymers or modified polymers according to the invention may be used in bulk, in solution or in emulsion/dispersion. By virtue of their variable properties, they may be used as binders, adhesives, adhesive sealing compounds and coatings. They are particularly suitable for substrates varying in their elastic behavior or in their thermal expansion coefficient, as is generally the case with different substrates. Suitable substrates are metals, such as aluminium, wood, paperboard, paper, wall coverings, such as wallpaper, cork, leather, felt, textiles, plastics (particularly floor coverings of PVC, linoleum and polyolefins), mineral substrates, such as glass, quartz, slags, rock and ceramics and metals. The plastics may be present in the form of films, sheets or other molded products.

The polymers or modified polymers according to the invention are particularly suitable for the production of printing ink binders, adhesive sticks, floor covering adhesives, multipurpose adhesives, plastisols, hotmelt adhesives or hotmelt sealants and paste-form sealants, such as jointing compounds. They may also be used for coating hard surfaces, textiles and paper.

The polymers or modified polymers according to the invention are extrudable and are therefore suitable for injection molding. They may be used, for example, as materials.

The polymers or modified polymers according to the invention, more particularly the salts and reaction products with polyethylene glycols, are suitable as polymeric emulsifiers, dispersants, thickeners or builders for detergents.

The low molecular weight polymers or modified polymers are suitable as soft resins and as tackifiers for modifying other commercially available polymers and polymer dispersions.

The invention is illustrated by the following Examples.

EXAMPLES

A) Test Methods
1) The glass transition temperature (TG) was determined as follows: DSC 910 measuring cell with DuPont 2100, Al crucible with 5 holes in its lid, 3 l/h $N_2$, 20 K/min.
2) The molecular weights were determined by gel permeation chromatography (GPC) carried out as follows:
   mobile solvent: tetrahydrofuran p.a.
   column system: Waters Styragel column set (6 in-tandem columns with 106, 105, 104, 103, 500 and 100 Angstroems, each measuring 300×7.8 mm)
   throughflow: 1.0 ml/min.
   detection: RID 6A RI detector (Shimadzu)
   detector range: 128
   chromatography
   data system: Spektra data system
   duration: 75–90 mins.
   sample preparation: about 100 to 200 mg of sample are carefully weighed into 50 ml measuring flasks and made up to the mark with THF. After waiting for at least 8 hours, aliquots of the sample solutions are filtered through a filter attachment and then chromatographed.
   calibration: polystyrene with various molecular weights disolved solved in THF (a product of PSS)

The number averages (Mn) and weight averages (Mw) of the molecular weights are shown.
3) The tensile shear strengths were determined as follows:
   test specimen: beech plywood, rigid PVC, aluminium size: 25×80 $mm^2$ bonded area: 25×20 $mm^2$
   storage: standard conditioning atmosphere of 23° C./50% relative humidity incubator, 40°+0.5° C.
   testing machine: Instron Series 4200
Test Parameters
   speed 50 mm/minute
   force transducer 10 KN (max.)
   control PC, Instron 104 Materials Testing System
   number of test specimens 5 per sample
4) The oleochemical characteristics were determined by the following DGF methods:
   acid value (AV): DGF C-V 2
   saponification value (SV): DGF M-IV 2
   hydroxyl value (OHV): DGF C-V 17b
   iodine value (IV): DGF C-V 11d The acid value (AV), saponification value (SV) and hydroxyl value (OHV) are shown in mg KOH/g while the iodine value (IV) is shown in g iodine/100 g.

B) The following raw materials were used:
1) Conjuene fatty acid Edenor UKD 60/10 (a product of Henkel KGBA) with the following specification:
   AV: 198–203
   IV: 138–148
   percentage of conjugated fatty acids: 56–67%
   linoleic acid: 2–9%
   oleic acid: 19–34%
2) Ricinene fatty acid Dedico 5981 (a product of Unichema) with the following specification:
   AV: 193–198
   SV: 195–202

C) Examples

Example 1

Reaction of Ricinene Fatty Acid with Maleic Anhydride 900 g of ricinene fatty acid and 196.9 g of maleic anhydride were weighed into a 2 liter three-necked round-bottomed flask. A stirrer-equipped apparatus with two reflux condensers placed one above the other was used as the reactor. The lower reflux condenser was connected to a thermostat set to 55° C. to ensure that the maleic anhydride did not crystallize in the condenser. The upper reflux condenser was cooled with tap water. The reactor was slowly heated with a heating mushroom. At an internal temperature of 50° C., the maleic anhydride melted and the exothermic reaction began. After the heat effect had abated, the reaction mixture was heated to 115° C. The viscosity of the yelloworange clear liquid increased over a period of 30 minutes. The heat was then removed. At room temperature, the product was yellow, clear and highly viscous.

According to GPC, the product consisted of two fractions. The low molecular weight fraction of 51.7% had a molecular weight Mn of 392 dalton and Mw of 485 dalton. The high molecular weight fraction of 48.3% had a molecular weight Mn of 15991 dalton and Mw of 40402 dalton.

Example 2 a) Production of Ricinene Fatty Acid Methyl Ester 2,000 g of ricinene fatty acid, 2,193 g of methanol and 19.2 g of methane sulfonic acid were weighed into a stirred apparatus with a 6 liter three-necked round-bottomed flask. The reactor was heated to 67° C. with a heating mushroom and boiled under reflux. The initially clear yellow liquid became more cloudy during the reaction. After about 8 h, the acid value was 5 and the reaction was terminated. The excess methanol/$H_2O$ was distilled off in vacuo (~10 mbar) up to 75° C. The product was then washed with hot water until neutral and was then dried. The methyl ester was distilled in a high vacuum up to a bottom temperature of 180° C. 10% was taken as first runnings. After cooling, the product was yellow, clear and liquid.

Characteristic data:

AV: 5.2

OHV: 3

V: 192

GPC: Mn=283 dalton, Mw 334 dalton b) Reaction of Ricinene Fatty Acid Methyl Ester with Maleic Anhydride 600 g of ricinene fatty acid methyl ester and 132 g of maleic anhydride were introduced into a 2 liter three-necked round-bottomed flask. A stirred apparatus with two condensers (see Example 1) was used as the reactor while a heating mushroom was used as the heat source. The contents of the reactor were then heated to 110° C. and boiled for 6 h. The reaction was then terminated. The product was yellow, clear and slightly viscous at room temperature. According to GPC, the product consisted of two fractions. The low molecular weight fraction of 46.6% had a molecular weight Mn of 364 dalton and Mw of 431 dalton. The high molecular weight fraction of 53.4% had a molecular weight Mn of 11905 dalton and Mw of 32864 dalton.

c) Partial Distillation of the Ricinene Fatty Acid Methyl Ester/MA Polymer 300 g of the reaction product of ricinene fatty acid methyl ester with maleic anhydride (Example 2a) were heated with a heating mushroom in a 500 ml two-necked round-bottomed flask. The contents of the flask were heated with stirring (magnetic stirrer) in a high vacuum to a bottom temperature of 240° C. and distilled. The residue (202.2 g) was an extremely tacky resin; the distillate (97.8 g) was light yellow and liquid. According to GPC, the product consisted of two fractions. The low molecular weight fraction of 26.1% had a molecular weight Mn of 462 dalton and Mw of 517 dalton. The high molecular weight fraction of 73.9% had a molecular weight Mn of 9174 dalton and Mw of 28957 dalton.

Example 3

Reaction of Edenor UKD 60/10 with Maleic Anhydride 800 g of Edenor UKD 60/10 and 192 g of maleic anhydride were weighed into a stirred apparatus comprising a 2 liter three-necked round-bottomed flask. The reaction began exothermically on gradual heating, the temperature rising beyond 100° C. A yellow rubber-elastic material was obtained after cooling to room temperature. According to GPC, the product consisted of 2 fractions. The low molecular weight fraction of 35% had a molecular weight Mn of 345 dalton and Mw of 428 dalton. The high molecular weight fraction of 65% had a molecular weight Mn of 9191 dalton and Mw of 36486 dalton.

Example 4 a) Preparation of Edenor UKD 60/10 methyl ester

For esterification, 1,820 g of Edenor UKD 60/10, 2,080 g of methanol and 15.6 g of methane sulfonic acid were introduced into a 6 liter three-necked round-bottomed flask and nitrogen was passed over. After 5 h at 67° C. (reflux), the product had an acid value of 4. At 80° C., a mixture of methanol/$H_2O$ was distilled off in vacuo (ca. 10 mbar). The product was then washed with hot water until neutral and was subsequently dried. First runnings of 5% were taken in a high vacuum, followed by distillation up to a bottom temperature of 180° C. The distilled methyl ester was yellow, clear and liquid.

AV: 6.7

SV: 201

OHV: 2.3

GPC: Mn=304 dalton and Mw=358 dalton b) Reaction of Edenor UKD 60/10 methyl ester with maleic anhydride 1,325 g of Edenor UKD 60/10 methyl ester and 26.5 g of maleic anhydride were weighed into a 4 liter three-necked round-bottomed flask equipped with a stirrer and boiled for 7 h at 116° C. After cooling, the product was yellow, clear and viscous. According to GPC, the product consisted of 2 fractions: the low molecular weight fraction of 48% had a molecular weight Mn of 269 dalton and Mw of 383 dalton. The high molecular weight fraction of 52% had a molecular weight Mn of 12266 dalton and Mw of 43936 dalton.

c) Distillation of Edenor UKD 60/10 Methyl Ester/MA Polymer 200 g of the reaction product of Edenor UKD 60/10 with maleic anhydride (Example 4b) were heated with a heating mushroom in a 500 ml two-necked round-bottomed flask. The contents of the flask were then heated with stirring (magnetic stirrer) in a high vacuum to a bottom ure of 240° C. and distilled. The residue (138.7 g) was yellow and tacky; the distillate (71.3 g) was light yellow and liquid.

According to GPC, the product consisted of 2 fractions. The low molecular weight fraction of 21% had a molecular weight Mn of 273 dalton and Mw of 386 dalton. The high molecular weight fraction of 79% had a molecular weight Mn of 11355 dalton and Mw of 45113 dalton.

Example 5 a) Steam Treatment of the Edenor UKD 60/10/MA Polymer 500 g of Edenor UKD 60/10 and 120 g of maleic anhydride were weighed into a 2 liter four-necked round-bottomed flask. The reaction took place as in Example 3. After termination of the reaction, the apparatus was augmented by a steam inlet tube and a distillation bridge with a descending condenser. Steam was then introduced for 3 h at 100° C. The product was white and creamy. After a while, water separated off.

b) Saponification of the Edenor UKD 60/10/Ma Polymer with KOH 100 g of the reaction product of Edenor UKD 60/10MA with maleic anhydride (see Example 3) were introduced into a 500 ml three-necked round-bottomed flask. 64 g of potassium hydroxide (50%) and 98.3 g of water were added dropwise, followed by stirring for 3.5 h at 80° C. After cooling, the product was brown and viscous.

c) Saponification of the Edenor UKD 60/10/MA Polymer with Ammonia 100 g of the reaction product of Edenor UKD 60/10 with maleic anhydride (see Example 3) were dissolved in 400 g of acetone and 100 g of water were added to the resulting solution. The solution was concentrated while heating to around 200 ml under normal pressure. After cooling, a white w/o emulsion was obtained. The emulsion did not wet glass. After storage for 3 days, the color of the emulsion changed to beige.

5 g of Rilanit HRE 60 were added while heating to this emulsion and ammonia was introduced with vigorous stirring until a pH value of 7 was reached. After cooling, a clear, brown and highly viscous solution was obtained. The solution is extremely stringy and dries to form an elastic film. The film turns very brittle in 3 to 4 weeks. The solution was suitable for the bonding of paper. The setting time was 2 to 3 minutes. No greasy patches were observed.

Example 6

Reaction of Edenor UKD 60/10 with Maleic Anhydride in the Presence of Radical Initiators 58.8 g of maleic anhydride and 280.0 g of Edenor UKD 60/10 were dissolved in 200 ml of acetone and a solution of 2.2 g of dilauroyl peroxide in 20 ml of acetone was added to the resulting solution. The solution was then slowly heated with stirring to 64° C. and refluxed for about 8 hours. After cooling, half the highly viscous solution was concentrated by evaporation in vacuo. An extremely tacky and soft polymer film is obtained.

According to GPC, the product consisted of 2 fractions. The low molecular weight fraction of 40% had a molecular weight Mn of 333 dalton and Mw of 406 dalton. The high molecular weight fraction of 60% had a molecular weight Mn of 26551 dalton and Mw of 81231 dalton.

The polymer formed was precipitated from the other half of the reaction solution by stirring in about 250 g of n-hexane. The solvents were largely separated from the polymer by decantation, after which the polymer was rewashed with n-hexane and the residual solvent was removed by distillation. An almost colorless, transparent and tack-free polymer was obtained in a yield of 110 g. The polymer was readily soluble in acetone, tetrahydrofuran and methanol.

According to GPC, the product consisted of 2 fractions; the low molecular weight fraction of 12% had a molecular weight Mn of 344 dalton and Mw of 413 dalton. The high molecular weight fraction of 88% had a molecular weight Mn of 27471 dalton and Mw of 83444 dalton. Melting range: >150° C. after storage for 3 weeks TG: ca. 10° C. (after storage for 2 weeks)

Example 7

Reaction of Edenor UKD 60/10 Methyl Ester with Maleic Anhydride in the Presence of Radical Initiators 58.8 g of maleic anhydride and 294 g of Edenor UKD 60/10 methyl ester (Example 4) were dissolved in 200 ml of acetone and a solution of 2.3 g of dilauroyl peroxide (DLP) in 20 ml of acetone was added to the resulting solution. The solution was then slowly heated with stirring to 64° C. and refluxed for about 7 hours. After cooling, the reaction solution was concentrated by evaporation in vacuo. A highly viscous golden yellow liquid was obtained and was stirred with about 800 g of n-hexane at room temperature. A white, extremely stringy deposit was formed. Removal of the solvent by decantation and drying of the residue in vacuo left 210 g of a golden yellow, soft and elastic polymer.

According to GPC, the product consisted of 2 fractions; the low molecular weight fraction of 10% had a molecular weight Mn of 371 dalton and Mw of 446 dalton. The high molecular weight fraction of 90% had a molecular weight Mn of 24321 dalton and Mw of 79116 dalton. Melting range: 85–95° C. TG:−22 to −32° C.

Example 8

Reaction of Edenor UKD 60/10 Methyl Ester with Maleic Anhydride (MA) and Vinyl Acetate in the Presence of Radical Initiators 280 g of Edenor UKD 60/10, 58.8 g of MA, 51.6 g of vinyl acetate and 2.7 g of DLP were dissolved in 200 g of acetone without heating at room temperature and the clear solution obtained was subsequently boiled under reflux for 7.5 hours at around 70° C. After 2 hours, an increase in viscosity was discernible. The reflux temperature fell back continuously to 65° C. until the reaction was terminated. The next day, 110 g of acetone were distilled off and the distillation residue was purified, i.e. the low molecular weight fractions were extracted twice with about 500 g of hexane. Removal of the solvent by decantation and drying of the residue in vacuo left a clear, colorless, non-tacky non-elastic polymer.

According to GPC, the product consisted of 2 fractions. The low molecular weight fraction of 10% had a molecular weight Mn of 371 dalton and Mw of 446 dalton. The high molecular weight fraction of 86% had a molecular weight Mn of 64231 dalton and Mw of 1698000 dalton. TG:+23° C.

Example 9

Reaction of Edenor UKD 60/10 Methyl Ester with Maleic Anhydride and Acrylic Acid in the Presence of Radical Initiators 280 g of Edenor UKD 60/10, 58.8 g of MA, 43.2 g of acrylic acid and 2.7 g of dilauroyl peroxide were dissolved in 200 g of acetone without heating at room temperature and the clear solution obtained was subsequently boiled under reflux for 7.5 hours at around 71° C. After 2 hours, an increase in viscosity is discernible. The reflux temperature fell back continuously to 67° C. until the reaction was terminated. The next day, 114 g of acetone were distilled off and the distillation residue was purified, i.e. the low molecular weight fractions were extracted twice with 500 g of hexane. Removal of the solvent by decantation and drying of the residue in vacuo left a clear, colorless, non-tacky and non-elastic polymer.

According to GPC, the product consisted of two fractions. The low molecular weight fraction of 10% had a molecular weight Mw of 511 dalton. The high molecular weight fraction of 90% had a molecular weight Mn of 47048 dalton and Mw of 142730 dalton. TG:+16° C.

Example 10

Purification of an Edenor UKD 60/10/MA Polymer

To prepare a particularly pure polymer, 601 g of Edenor UKD 60/10, 127 g of MA and 7.1 g of dilauroyl peroxide were reacted in methyl ethyl ketone/petroleum ether (472 g and 728 g) as in Example 6. For purification, the polymer initially precipitating was washed with 300 g of petroleum ether, taken up in 200 g of methyl ethyl ketone and precipitated with 600 g of petroleum ether. The polymer was then rewashed with 400 g of petroleum ether and dried. The product was colorless and solid (GPC: 92% polymer). For further purification, the polymer was redissolved in methyl ethyl ketone, precipitated with petroleum ether and washed 4 times with 300 g of petroleum ether. The product was colorless and solid (GPC: 98.6%) polymer with Mn=40,000 and Mw=95,000).

Example 11

Hydrogenation of an Edenor UKD 60/10/MA Polymer

A polymer was prepared as in Example 6 from 650 g of Edenor UKD 60/10, 137 g of MA and 7.9 g of dilauroyl peroxide in methyl ethyl ketone/petroleum ether (516 g and 787 g). The polymer was purified by washing with 300 g of petroleum ether (GPC: 89% polymer with Mn=41,000). 300 g of THF and 1.25 g of palladium on carbon were added to 100 g of a 50% solution of this product in THF, followed by hydrogenation for 6 hours at 80° C. under a hydrogen pressure of 100 bar. The product was filtered through Celite, the solvent was evaporated and the product was then dried. The product was colorless and brittle. The GPC shows a broad signal at Mn=500,000 and Mw >10 million with a fraction of 85%.

Example 12

Reaction of an Edenor UKD 60/10/MA Polymer with Oleyl Alcohol 200 g of a 50% solution of a reaction product—similar to Example 6—of 650 g of Edenor UKD 60/10 and 137 g of MA were reacted while stirring with 15.8 g of dilauroyl peroxide in methyl ethyl ketone/petroleum ether (516 g and 787 g) and purified by washing with 300 g of petroleum ether. GPC: 82% polymer with Mn=42,000. The product was reacted with 72.5 g of oleyl alcohol (Ocenol 90/95, Henkel KGaA) in THF for 3 hours at 70° C. After evaporation of the THF, 110 g of water and 16 g of 50% sodium hydroxide were added, followed by stirring for 1 hour at room temperature. The resulting, approximately 50% solution is clear and highly viscous.

Example 13

Reaction of an Edenor UKD 60/10/MA Polymer with Ethylene Glycol 0.6 g of ethylene glycol were refluxed with stirring for 4 hours in THF with 50 g of a 15% solution of a reaction product similar to Example 6 (650 g of Edenor UKD 60/10 and 137 g of MA with 15.8 g of dilauroyl peroxide in methyl ethyl ketone/petroleum ether (516 g and 787 g), purification by washing with 300 g of petroleum ether, GPC: 82% polymer with Mn=42,000). A clear colorless solution was formed. The solution was converted into a film on a Teflon plate. The film was clear, colorless and hard. The GPC shows one signal at Mn=32,600 making up 89% and two signals with peaks below 1,000 making up a total of 11%.

Example 14

Reaction of an Edenor UKD 60/10/MA Polymer with Polyethylene Glycol 11.9 g of polyethylene glycol 600 dissolved in the same quantity of THF were heated with stirring for 1 hour to 64° C. with 50 g of a 10% solution of a reaction product similar to Example 6 (650 g of Edenor UKD 60/10 and 137 g of MA with 15.8 g of dilauroyl peroxide in methyl ethyl ketone/petroleum ether (516 g and 787 g), purification by washing with 300 g of petroleum ether; GPC: 82% polymer with Mn=42,000) in THF and 0.56 g of N-methyl imidazole. A yellow cloudy solution was formed. After cooling, the solidified solution turned into a gel which could easily be vibrated.

Example 15

Reaction of an Edenor UKD 60/10/MA Polymer with Magnesium Oxide 38.0 g of a 50% solution of a reaction product similar to Example 6 (650 g of Edenor UKD 60/10 and 137 g of MA with 15.8 g of dilauroyl peroxide in methyl ethyl ketone/petroleum ether (516 g and 787 g), purification by washing with 300 g of petroleum ether; GPC: 82% polymer with Mn=42,000) in THF were intensively stirred with 2.0 g of magnesium oxide. The mixture was dried in vacuo for 2 hours at 75° C. and formed a light yellow compound which was hard at room temperature but became elastic on heating.

Example 16

Complete Esterification of an Edenor UKD 60/1 0/MA Polymer

A conjudiene fatty acid/MA polymer similar to Example 6 was reacted with excess methanol in the absence of a catalyst to form the semiester (AV=145 mg KOH/g). 26.15 g of this methyl semiester polymer were dissolved in 200 g of dimethyl formamide and 19.2 g of methyl iodide were added to the resulting solution with stirring. After 15 minutes, 79.2 g of a 25% tetrabutyl ammonium hydroxide solution in methanol were slowly added dropwise in 45 minutes to the solution which had changed color from pale yellow to golden yellow. After 10 to 15 minutes, the originally clear solution became cloudy. The solvents were distilled off, the residue was taken up in 200 ml of tetrahydrofuran (THF) and the THF-insoluble fraction was separated off. After about 700 ml of methanol had been added to the clear filtrate, the polymer precipitated and the supernatant solution was decanted off. The residual solvents were then removed from the polymer obtained by vacuum distillation. A light yellow, soft, highly elastic and tacky polymer which no longer contained any low molecular weight components was obtained. Molecular weight (GPC): MW 93,000 AV: 4.6 mg KOH/g

Example 17

Reaction of an Edenor UKD 60/10/MA Polymer with Butylamine to form a Butylimide a) Production of the Semi-Amide 300.1 g of the polymer of Example 6 were dissolved in about 500 g of tetrahydrofuran. A solution of 55.0 g of n-butylamine in about 60 g of tetrahydrofuran was then slowly added dropwise with stirring. After the addition, the solution was refluxed for 2 hours and the solvent was then distilled off. Yield: 355.2 polymer Appearance of the polymer (semi-amide): yellow-brown, non-elastic, non-tacky AV: 252 mg KOH/g (theor. 249)

b) Reaction of the semi-amide to form the imide 200 g of the butylamide were mixed with about 200 g of cumene and the mixture was heated to its boiling temperature (about 155° C.) and refluxed for 3.5 hours on a water separator. The cumene was then distilled off. The amount of water removed came to 7.4 ml. According to GPC, the product consisted of 2 fractions. The conjudiene fatty acid N-butyl maleic imide polymer obtained is golden yellow, highly elastic and tacky. The low molecular weight fraction of 22% had a molecular weight Mw of 508 dalton. The high molecular weight fraction of 78% had a molecular weight Mn of 52602 dalton and Mw of 153855 dalton.

AV: 140 mg KOH/g (theor. 130)

Example 18

Bonding Tests with a 50% Solution of the Polymers in THF

Tensile shear strength in N/mm² was measured on various substrates after storage for 7 days at room temperature (RT=ca. 20° C.) or for 4 weeks at 40° C.

| Example | 6 | 5a | 17b |
|---|---|---|---|
| Wood/wood 7 days, RT | 4.01 | 3.92 | 2.72 |
| Wood/PVC 7 days, RT | 1.02 | 0.41 | 1.96 |
| Wood/alu 7 days, RT | 1.77 | 4.52 | 1.35 |
| Wood/alu 4 weeks, 40° C. | 3.41 | 1.95 | 3.49 |

What is claimed is:

1. A polymer obtained by reaction of:
   (A) at least one fatty acid or fatty acid derivative containing at least one conjugated carton-carbon double bond;
   (B) it least one component selected from the group consisting of maleic acid, citraconic acid, itaconic acid, aconitic acid, 3,4,5,6-tetrahydrophthalic acid and derivatives thereof,
   wherein said polymer has a weight average molecular weight of above 5,000.

2. The polymer of claim 1 wherein (A) and (B) are present in a molar ratio of 1:0.1 to 1:10.

3. The polymer of claim 1 where in addition to (A) and (B) at least one copolymerizable alkene component (C) containing no electron acceptor substituents is reacted to form the polymer.

4. The polymer of claim 3 wherein (C) is present in a molar ratio of up to 10 relative to (A).

5. The polymer of claim 3 wherein (C) is selected from the group consisting of vinyl ethers, vinyl esters, α-olefins, styrene, styrene derivatives, conjugated hydrocarbons, vinyl pyrrolidones, and mixtures thereof.

6. The polymer of claim 1 having a weight average molecular weight above 10,000 and up to 1,700,000.

7. The polymer of claim 1 wherein (A) is selected from the group consisting of ricinene fatty acid, ricinene fatty acid methyl esters, isomerized isolene fatty acids, methyl esters of isomerized isolene fatty acids, dehydrated castor oil, conjugated safflower oil, and sunflower oil.

8. The polymer of claim 1 wherein (A) is an aliphatic unsaturated carboxylic acid containing 16 to 24 carbon atoms and two or more conjugated carbon-carbon double bonds, an ester of said aliphatic unsaturated carboxylic acid, an amide of said aliphatic unsaturated carboxylic acid, or a mixture thereof.

9. The polymer of claim 1 wherein said polymer is modified with one or more reagents selected from the group consisting of alcohols, amines, and epoxides.

10. A polymer obtained by reaction of
   (A) it least one member selected from the group consisting of aliphatic unsaturated carboxylic acids containing 16 to 24 carbon atoms and two or more conjugated carbon-carbon double bonds, esters of said aliphatic unsaturated carboxylic acids, and amides of said aliphatic unsaturated carboxylic acid;
   (B) it least one compound selected from the group consisting of maleic acid, citraconic acid, itaconic acid, aconitic acid. 3,4,5,6-tetrahydrophthalic acid, and anhydrides, imides, alkylimides, nitriles, amides alkylamides, arylamides, aldehydes, esters and semiesters thereof and mixtures thereof and
   (C) optionally, at least one copolymerizable alkene component containing no electron acceptor substituents;
   wherein (A) and (B) are present in a molar ratio of 1:0.1 to 1:10 and said polymer has a weight average molecular weight of above 5,000.

11. The polymer of claim 10 wherein (A) and (B) are present in a molar ratio of 1:0.5 to 1:1.5.

12. The polymer of claim 10 wherein 0.2 to 10 moles (C) are present per mole of (A).

13. The polymer of claim 10 wherein at least one of (C) is selected from the group consisting of vinyl ethers, vinyl esters, styrene, styrene derivatives, and vinyl pyrrolidones.

14. The polymer of claim 10 wherein the weight average molecular weight is above 10,000 and up to 1,700,000.

15. The polymer of claim 10 wherein (A) is selected from the group consisting of ricinene fatty acid, ricinene fatty acid methyl esters, isomerized isolene fatty acids, methyl esters of isomerized isolene fatty acids, dehydrated castor oil, conjugated safflower oil, and sunflower oil.

16. The polymer of claim 10 wherein at least one of (A) is selected from the group consisting of 10,12-octadecadienoic acid, 9-hydroxy-10,10-octadecadienoic acid, 13-hydroxy-9,11-octadecadienoic acid, 9,14-dihydroxy-10,12-octadecadienoic acid, 9,12, 14octadecatrienoic acid, 8,10,12-octadecatrienoic acid, elaeostearic acid, licanic acid, camolenic acid, parinaric acid, isanoic acid, isanolic acid, ximenynic acid, matricaria acid, lachnophyllic acid, mycomycinic acid, and mixtures thereof.

17. The polymer of claim 10 wherein at least one of (A) is isomerized isolene fatty acid or ricinene fatty acid or a methyl ester thereof and at least one of (B) is maleic anhydride.

18. The polymer of claim 10 in saponified form.

19. The polymer of claim 10 in hydrogenated form.

20. The polymer of claim 10 wherein said polymer is modified with one or more reagents selected from the group consisting of alcohols, amines, and epoxides.

21. The polymer of claim 10 wherein said polymer is crosslinked.

22. A process for producing the polymer of claim 1 wherein a reaction mixture comprised of (A) and (B) is heated.

23. The process of claim 22 wherein said reaction mixture is diluted with a solvent.

24. The process of claim 22 wherein the reaction mixture is additionally comprised of a radical-forming initiator.

25. A method of bonding a first substrate to a second substrate using an adhesive, wherein said adhesive comprises the polymer of claim 1.

26. A method of bonding a first substrate to a second substrate using an adhesive, wherein said adhesive comprises the polymer of claim 10.

27. A method of coating a substrate using a coating composition, wherein said coating composition comprises the polymer of claim 1.

28. A method of coating a substrate using a coating composition, wherein said coating composition comprises the polymer of claim 10.

29. A method of sealing a substrate using a sealant, wherein the sealant comprises the polymer of claim 1.

30. A method of sealing a substrate using a sealant, wherein the sealant comprises the polymer of claim 10.

31. A method of making a composition comprised of at least one emulsifier, dispersant, thickener or builder, said method comprising using the polymer of claim 1 as said emulsifier, dispersant, thickener or builder.

32. A method of making a composition comprised of at least one emulsifier, dispersant, thickener or builder, said method comprising using the polymer of claim 10 in salt form or modified with a polyethylene glycol as said emulsifier, dispersant, thickener, or builder.

33. A method of filling a substrate using a filler, wherein said filler comprises the polymer of claim 1.

34. A method of filling a substrate using a filler, wherein said filler comprises the polymer of claim 10.

35. The polymer of claim 1 wherein at least one of (B) is maleic anhydride.

36. The polymer of claim 10 wherein at least one of (B) is maleic anhydride.

* * * * *

UNITED STATES PATENT AND TRADEMARK OFFICE
CERTIFICATE OF CORRECTION

PATENT NO.   : 6,531,563 B1
DATED        : March 11, 2003
INVENTOR(S)  : Klein et al.

It is certified that error appears in the above-identified patent and that said Letters Patent is hereby corrected as shown below:

Column 15,
Line 35, delete "carton-carbon" and insert therefor -- carbon-carbon --.
Line 37, after "(B)", delete "it", and insert therefor -- at --.

Column 16,
Line 5, after "(A)", delete "it", and insert therefor -- at --.
Line 11, after "(B)", delete "it" and insert therefor -- at --.
Lines 39 and 40, delete "14octadecatrienoic" and insert therefor
-- 14-octadecatrienoic --.

Signed and Sealed this

Sixth Day of May, 2003

JAMES E. ROGAN
*Director of the United States Patent and Trademark Office*